United States Patent [19]

Willars

[11] Patent Number: 5,953,325
[45] Date of Patent: Sep. 14, 1999

[54] FORWARD LINK TRANSMISSION MODE FOR CDMA CELLULAR COMMUNICATIONS SYSTEM USING STEERABLE AND DISTRIBUTED ANTENNAS

[75] Inventor: Per Willars, Stockholm, Sweden

[73] Assignee: Telefonaktiebolaget L M Ericsson (publ), Sweden

[21] Appl. No.: 08/778,358

[22] Filed: Jan. 2, 1997

[51] Int. Cl.$^6$ .................................................. H04Q 1/00
[52] U.S. Cl. ..................... 370/335; 370/342; 455/562; 455/277.1
[58] Field of Search .................. 370/335, 330, 370/342; 455/562, 277.1, 277.2, 67.1, 67.4; 342/374

[56] References Cited

U.S. PATENT DOCUMENTS

| | | | |
|---|---|---|---|
| 4,128,740 | 12/1978 | Graziano | 179/2 EB |
| 4,144,496 | 3/1979 | Cunningham et al. | 325/53 |
| 4,506,385 | 3/1985 | Fedde et al. | 455/226 |
| 4,947,452 | 8/1990 | Hattori et al. | 455/63 |
| 5,103,460 | 4/1992 | Stewart | 375/1 |
| 5,280,472 | 1/1994 | Gilhousen et al. | 370/18 |
| 5,315,616 | 5/1994 | DeLisle et al. | 375/1 |
| 5,345,599 | 9/1994 | Paulraj et al. | 455/49.1 |
| 5,349,606 | 9/1994 | Lovell et al. | 375/1 |
| 5,365,543 | 11/1994 | Takahashi et al. | 375/1 |
| 5,371,760 | 12/1994 | Allen et al. | 375/1 |
| 5,377,225 | 12/1994 | Davis | 375/1 |
| 5,381,443 | 1/1995 | Borth et al. | 375/1 |
| 5,394,435 | 2/1995 | Weerackody | 375/206 |
| 5,396,645 | 3/1995 | Huff | 455/33.4 |
| 5,437,055 | 7/1995 | Wheatley, III | 455/33.3 |
| 5,509,014 | 4/1996 | Utting | 370/95.3 |
| 5,551,060 | 8/1996 | Fujii et al. | 455/562 |
| 5,581,260 | 12/1996 | Newman | 455/277.2 |
| 5,596,333 | 1/1997 | Bruckert | 455/277.1 |
| 5,684,491 | 11/1997 | Newman et al. | 455/277.1 |
| 5,691,729 | 11/1997 | Gutman et al. | 455/277.2 |
| 5,790,537 | 8/1998 | Yoon et al. | 370/342 |
| 5,799,004 | 8/1998 | Keskitalo | 370/335 |

FOREIGN PATENT DOCUMENTS

| | | |
|---|---|---|
| 0 648 028 A1 | 10/1994 | European Pat. Off. . |
| 0 668 668 A1 | 2/1995 | European Pat. Off. . |
| 0 700 174 A1 | 3/1996 | European Pat. Off. . |
| 2 295 524 | 5/1996 | United Kingdom . |
| 2 297 224 | 7/1996 | United Kingdom . |
| WO 96/30964 | 10/1996 | WIPO . |

OTHER PUBLICATIONS

Alfred Baier, et al., "Design Study for a CDMA–Based Third Generation Mobile Radio System," IEEE Journal on Selected Areas in Communications, vol. 12, No. 4, pp. 733–743 (May 1994).

*Primary Examiner*—Brian Zimmerman
*Attorney, Agent, or Firm*—Jenkens & Gilchrist, P.C.

[57] ABSTRACT

A DS-CDMA cellular system is provided that employs two forward link transmission modes in parallel. A conventional transmission mode broadcasts a pilot channel that can be used by a conventional mobile station to estimate and detect a dedicated traffic channel. The second transmission mode transmits (via a sectorized or narrow lobe antenna system) all information required by a new generation mobile station to estimate and detect a traffic channel dedicated to that mobile station. Consequently, DS-CDMA system operators can introduce the use of adaptive array antenna systems or distributed antenna systems with new generation mobile stations, without terminating the use of the conventional mobile stations.

30 Claims, 2 Drawing Sheets

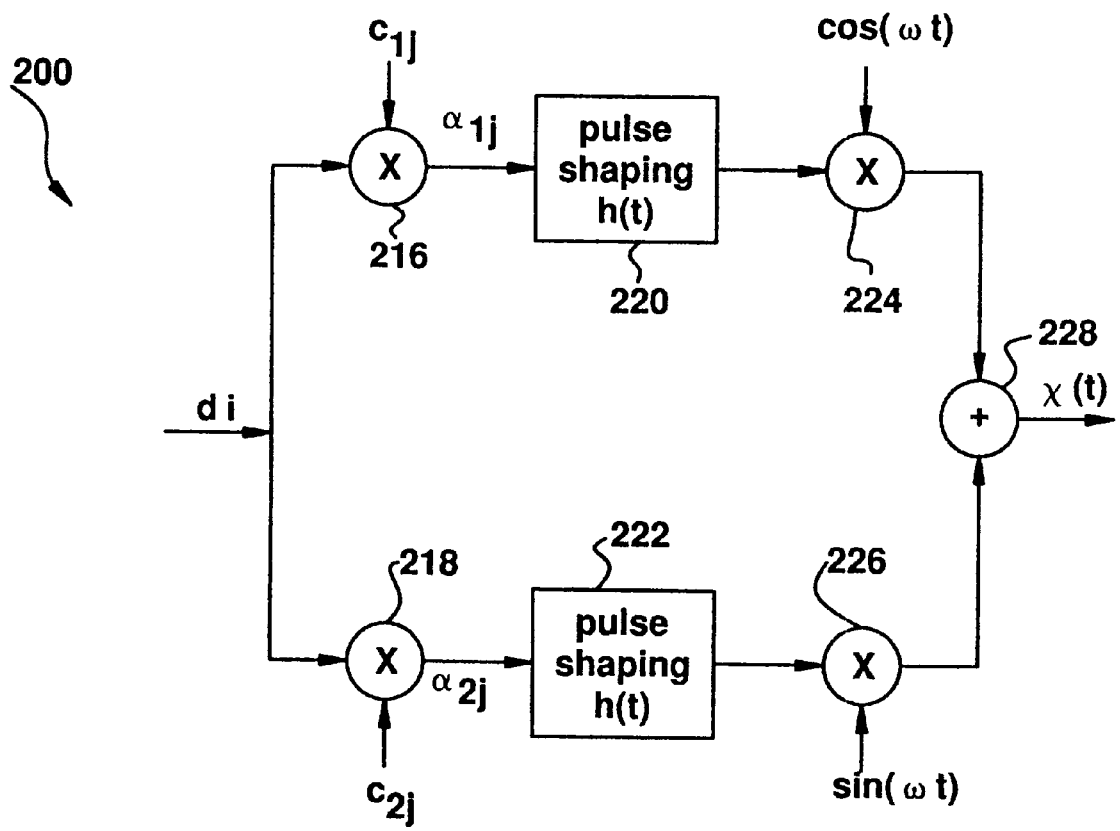

FORWARD LINK TRANSMISSION MODE FOR CDMA CELLULAR COMMUNICATIONS SYSTEM USING STEERABLE AND DISTRIBUTED ANTENNAS

BACKGROUND OF THE INVENTION

1. Technical Field of the Invention

The present invention relates generally to the telecommunications field and, in particular, to the use of adaptive antenna arrays or distributed antennas in a forward link of a Direct Sequence-Code Division Multiple Access (DS-CDMA) cellular communications system.

2. Description of Related Art

The next generation of cellular communications systems will be required to provide a broad range of services including digital voice, video and data in different transmission modes. These systems will require higher bit rates and higher received signal power levels, which will result in increased interference between users. Consequently, in order to obtain the high capacities that will be required of these systems, the interference levels will have to be reduced dramatically, and especially in the forward links (network to mobile direction).

Reduced user interference levels in the forward links of these systems can be obtained by increased base station antenna sectorization. Adaptive antenna arrays can be utilized to form relatively narrow beams and thus reduce the size of the user interference areas. For example, adaptive or steerable antenna arrays can provide high antenna gains by transmitting information to individual users in highly directional, narrow beams or lobes. These narrow beams reduce the areas of potential interference. Similarly, distributed antenna systems utilize a plurality of antenna elements positioned at different locations (e.g., "radio access ports"). Consequently, information is transmitted to a user from the closest antenna element (port), which also serves to reduce the potential areas of user interference.

In such a sectorized-antenna CDMA system, base station transmits the traffic channel data on a code channel for a particular mobile station in one antenna lobe. If pilot channel is broadcast over the same area as the narrow antenna lobes, then each antenna lobe is treated as a separate cell. Consequently, if the mobile station moves into a different antenna lobe, which defines a different cell, a handoff of the mobile station between the two cells will have to occur. With each pilot channel thus defining a cell, increased antenna sectorization results in a situation where the mobile stations cross the cell borders more frequently, which leads to a larger number of handoffs. Since there is an upper limit to the number of handoffs such a system can process efficiently, a design trade-off must be made between the amount of antenna sectorization desired and user interference that can be accepted.

Current DS-CDMA systems being developed include those that adhere to the IS-95 standard (ANSI J-STD-008) and the European RACE Project R2020 (known as the Code Division Testbed or "CODIT"). Both of these types of systems use a broadcasted pilot channel in the forward link for two main purposes (once the initial connection between a mobile and base station has been established): (1) identifying individual cells for Mobile-Assisted Handoffs (MAHOs); and (2) facilitating coherent detection of traffic channel data by the mobile stations. Essentially, these systems will use the same pilot symbols for broadcasted cell identification information and facilitating coherent detection by all mobiles in a cell, in order to improve system performance without adding excessive pilot symbol overhead.

For such IS-95 and CODIT systems, the forward link air interfaces have been specified so that the mobile stations are required to use QPSK modulation with coherent detection. The pilot channel is used to facilitate the coherent detection process. Consequently, if the traffic channel is transmitted over a different (adaptive) antenna lobe or from a different (distributed) antenna element than the pilot channel, the mobile stations will experience significant detection errors. These detection errors can occur for two reasons: (1) the searching algorithm used in the mobile stations will direct the receivers to demodulate rays that contain pilot signal energy but no traffic signal energy; and (2) the phase of the pilot channel and traffic channel will be different, because they are transmitted from different antennas or different sets of antenna elements. Consequently, these conditions cause the mobile stations to make erroneous channel estimations which lead to corrupted demodulated signals.

Relatively simple approaches to resolving these problems would be to use either non-coherent detection by the mobile station in the forward link, or provide dedicated pilot symbols for each traffic channel. However, the performance of conventional systems using those approaches would be degraded substantially, in comparison to systems using coherent detection (at the mobile station) facilitated by broadcasting a common pilot channel. Also, newer systems using these approaches would not be compatible with those conventional mobile stations that are designed to use the broadcasted pilot channel to detect and demodulate incoming signals.

SUMMARY OF THE INVENTION

A DS-CDMA cellular system is provided that employs two forward link transmission modes in parallel. A conventional transmission mode broadcasts a pilot channel that can be used by a conventional mobile station to estimate and detect a dedicated traffic channel. The second transmission mode transmits (via a sectorized antenna system) all information required by a new generation mobile station to estimate and detect a traffic channel dedicated to that mobile station.

For systems using conventional broadcast cells, a mode controller selects the conventional forward link transmission mode. For sectorized systems (e.g., using adaptive arrays or distributed antennas), the common control channels utilize the conventional transmission mode. The mobile station transmits a signal that indicates whether or not it is equipped to support the new transmission mode. The cellular network can then determine, for each such mobile station, whether the conventional or new forward link transmission mode should be used. Preferably, if a mobile station is designed to operate with the new forward link transmission mode, the network selects the new transmission mode. If not, the network selects the conventional forward link transmission mode.

BRIEF DESCRIPTION OF THE DRAWINGS

A more complete understanding of the method and apparatus of the present invention may be had by reference to the following detailed description when taken in conjunction with the accompanying drawings wherein:

FIG. 3 is a schematic circuit block diagram of a conventional signal processor unit that can be used for the "old" forward link transmission mode unit shown in FIG. 1.

DETAILED DESCRIPTION OF THE PREFERRED EMBODIMENT

Figure 1:
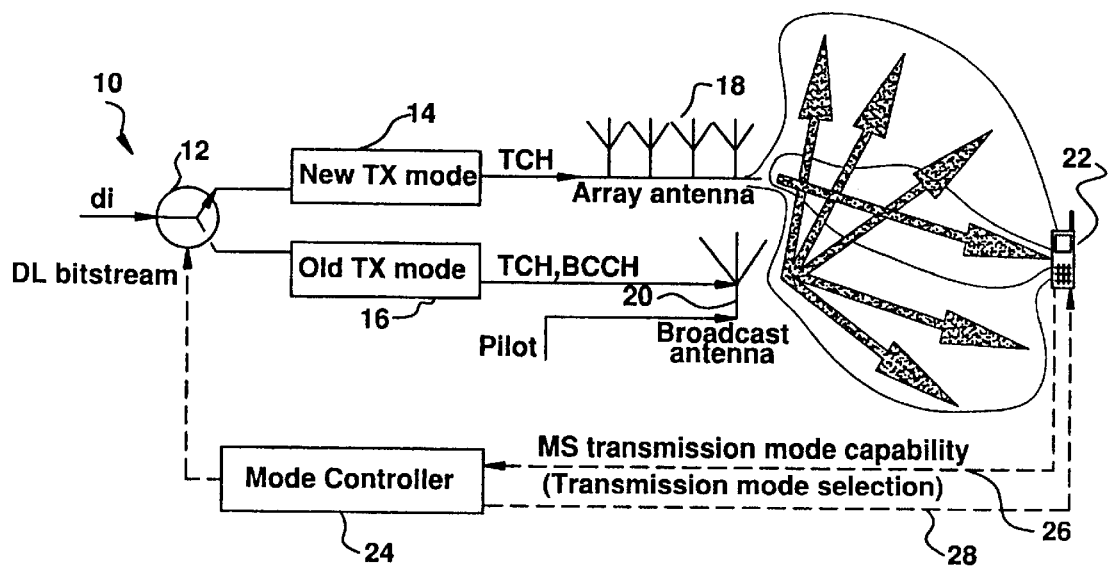
FIG. 1 is a schematic block diagram that illustrates a system that can be used to provide parallel forward link transmission modes in a cellular communications system, in accordance with a preferred embodiment of the present invention.
Figure 2:
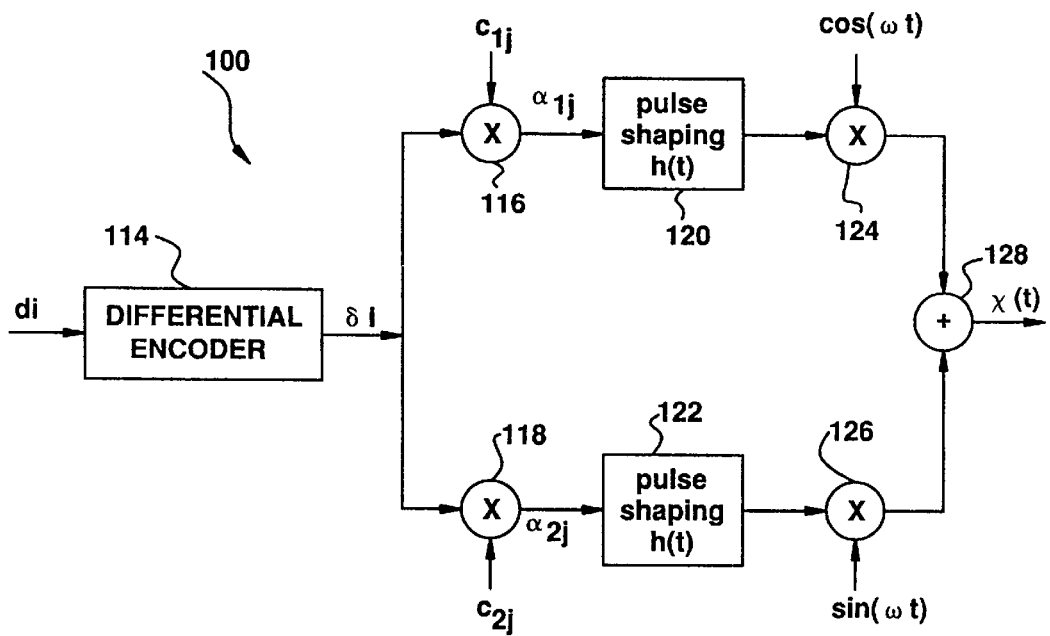
FIG. 2 is a schematic circuit block diagram of a signal processor unit that can be used to implement the new forward link transmission mode shown in FIG. 1, in accordance with the preferred embodiment of the present invention.

The preferred embodiment of the present invention and its advantages are best understood by referring to FIGS. 1–3 of the drawings, like numerals being used for like and corresponding parts of the various drawings.

Essentially, for the preferred embodiment of the present invention, a DS-CDMA cellular system is provided that employs two forward link transmission modes in parallel. A conventional transmission mode broadcasts a pilot channel that can be used by a conventional mobile station to estimate and detect a dedicated traffic channel. The second transmission mode transmits (via a sectorized antenna system) all information required by a new generation mobile station to estimate and detect a traffic channel dedicated to that mobile station.

For systems using conventional cells (e.g., broadcasted cells not defined by adaptive array or distributed antenna lobes), the conventional forward link transmission mode is selected. For sectorized systems (e.g., using adaptive arrays or distributed antennas), the common control channels (e.g., broadcast control channel, paging channel, and access grant channel) utilize the conventional transmission mode. However, at call setup, once the initial connection between the mobile station and base station has been established, the mobile station transmits a signal parameter that indicates whether or not it is equipped to support the new (second) transmission mode. The cellular network can then determine, for each such mobile station, whether the conventional or new forward link transmission mode should be used. Preferably, if a mobile station is designed to operate with the new forward link transmission mode, the network selects the new transmission mode. If a mobile station does not transmit a signal indicating that it can operate with the new forward link transmission mode, the network selects the conventional forward link transmission mode.

Specifically, FIG. 1 is a schematic block diagram that illustrates a system that can be used to provide parallel forward link transmission modes in a cellular communications system, in accordance with a preferred embodiment of the present invention. Base station 10 includes a switch 12 that can route a bitstream of information, $d_i$, (e.g., digital data, voice, video) to a selected one of two forward link transmission mode units. The position of switch 12 is selectively controlled by control signals from a transmission mode controller 24 preferably located in base station 10. Alternatively, a separate mode controller 24 can be provided for each mobile station, either at base station 10 or as a component part of a user's mobile station 22. In the exemplary embodiment shown, the dashed lines between mode controller 24, switch 12, and mobile station 22 denote a flow of control signals therebetween (e.g., via the air interface).

An output of switch 12 is connected to one of a "new" transmission mode signal processor unit 14, or a conventional ("old") transmission mode signal processor unit 16. An output of new transmission mode signal processor unit 14 is connected to an adaptive antenna array 18. Alternatively, a distributed antenna system (e.g., a plurality of radio access ports) can be used in place of adaptive array 18. Essentially, each directional energy lobe transmitted from adaptive array 18 defines a narrow lobe. Similarly, each energy lobe transmitted by an element (radio port) of a distributed antenna system also defines a narrow lobe. As such, any type of sectorized antenna system, which transmits a relatively narrow energy lobe, either fixed or steerable, can fall within the scope of the present invention.

The pilot channel, broadcast channels, and some traffic channels can be transmitted over the conventional transmission mode (16) via a broadcast antenna 20. The broadcast antenna 20 provides full cell coverage for those mobile stations that are equipped to use the conventional forward link transmission mode (16). Other traffic channels are transmitted over the new transmission mode (14) via the array antenna (or distributed antenna element) to the individual mobile stations (e.g., 22), which are equipped to operate with the new forward link transmission mode. For flexibility in this embodiment, the newer mobile stations can be equipped to operate with either the new or old forward link transmission mode.

Using the new forward link transmission mode (14) with an adaptive antenna array (18), each mobile station's traffic channel is transmitted over an individual antenna lobe (e.g., a traffic channel lobe). Each such antenna lobe is much narrower than the broadcast antenna (20) sector. With a distributed antenna system, for example, one of a plurality of fixed antenna lobes can be transmitted directionally to a mobile station. With an adaptive antenna array, for example, one antenna lobe can be formed and directed to an individual mobile station. The formation of such an individual antenna lobe can be accomplished with a conventional adaptive antenna transmission scheme.

As described above, transmission mode controller 24 controls the routing of forward link traffic signals to either the new transmission mode signal processor unit 14 or the conventional transmission mode signal processor unit 16. During call setup, an appropriately equipped mobile station (e.g., mobile station 22) attempting to make contact with base station 10, transmits control signals via air interface link 26 that identify that mobile station's "new" transmission mode compatibility. Accordingly, mode controller 24 directs switch 12 to route the forward link bitstream, $d_i$, to "new" transmission mode unit 14. Otherwise, if the mobile station is not equipped to communicate via the new transmission mode, those control signals are not sent to mode controller 24. Consequently, mode controller 24 assumes that only the conventional transmission mode will be used for this mobile station, and directs switch 12 to route the forward link bitstream, $d_i$, to "old" transmission mode unit 16.

In addition to determining the presence or absence of mode transmission control signals from a mobile station, mode controller 24 can decide whether or not to select the new transmission mode, based on other criteria. One criterion that can be used by the mode controller for such a decision is the type of service requested by the mobile user. For example, the mode controller (24) can select the new transmission mode if the bit rate of the requested service is higher than a predetermined rate. Or, the new transmission mode can be selected based on cell configuration data. For example, as described above, the new transmission mode can be selected if the cellular system involved defines individual cells using an adaptive antenna array or distributed antenna system (e.g., plurality of antenna elements or radio access ports).

If mode controller 24 selects the new transmission mode for an individual mobile station, the base station transmits a control message to the mobile station via the air interface link 28, which informs the mobile station that the new mode has been selected for forward link transmissions to that mobile station.

In the event that a mobile station operating with the new transmission mode moves into a cell defined by a different base station, it is possible that the different base station is (or is not) capable of operating with the new forward link transmission mode. Consequently, it is within the scope of the present invention for the system to be capable of switching over from one transmission mode to another (new to old or vice versa) during an active connection between the mobile and base station. This active switching operation can be accomplished, for example, by the base station indicating in a handoff message to the mobile station the specific transmission mode currently being used, along with timing information about when the handoff should occur. If a soft handoff operation is occurring, the transmission mode selected can be the same for all of the base stations included in the active set of users. Alternatively, different base stations can use different transmission modes.

In a second embodiment of the present invention, if a distributed antenna system is in use (as opposed to the adaptive array shown in FIG. 1), the broadcast channel and pilot channel can be transmitted from all of the distributed antenna elements (e.g., all of the radio access ports) in the cell. However, the traffic channel is transmitted preferably from either one or a select plurality of antenna elements or radio access ports to an appropriately equipped mobile station (22).

FIG. 2 is a schematic circuit block diagram of a signal processor unit 100 that can be used to implement the new forward link transmission mode (14) shown in FIG. 1, in accordance with the preferred embodiment of the present invention. The embodiment shown in FIG. 2 can be for use in a known CODIT environment. However, the invention is not intended to be so limited and can be used with any appropriate CDMA-type system. For example, in accordance with the present invention, an alternative to the CODIT-based implementation described directly below (wherein the physical data channel and physical control channel are separated) is to differentially encode the full traffic channel. In the embodiment illustrated by FIG. 2, for the forward link modulation format, the physical control channel data is differentially encoded before spreading (spread spectrum) with the dedicated spreading code, and then it is QPSK modulated for transmission via array 18 to the mobile station (22). The forward link physical data channel data is also QPSK modulated for transmission via array 18, but the physical data channel data is not differentially encoded. By differentially encoding the forward link physical control channel data, the signal transmitted on the narrow lobe from array 18 can be received and demodulated at the mobile station using a differential coherent detection scheme. Consequently, by using this differential forward link modulation scheme, a receiving mobile station (22) can accurately estimate the channel phase for the incoming differentiated data symbols. In other words, by using differential encoding for the forward link physical control channel data, the receiver in the mobile station (22) does not need a pilot channel as a reference for channel estimation. The differentially encoded bitstreams can be detected without explicitly estimating the channel phase. Channel estimation is accomplished in the differential coherent detection process. Therefore, the mobile station's receiver can decode the physical control channel data without relying on the pilot channel. The receiver can then use the channel estimations from the physical control channel detection to successfully detect and decode the QPSK modulated physical data channel.

Specifically, referring to the embodiment illustrated in FIG. 2, different spreading codes in the I and Q channels are used. The physical control channel data bits, $d_i$, to be differentially encoded are input to differential encoder 114. The output signal from differential encoder 114 can be expressed as:

$$\delta_i = d_i \cdot \delta_{i-1}, \delta_i \in \{\pm 1\} \quad (1)$$

The differentially encoded data bits $\delta_i \in \{\pm 1\}$ are split into two signals and coupled to a respective multiplier (spectrum spreader) 116 and 118. In each path, these data bits are multiplied with different binary spreading sequences having the respective values $c_{1,j}, c_{2,j} \in \{\pm 1\}$.

Each differentially encoded spread signal, $\alpha_{1,j}, \alpha_{2,j}$, at the output of the respective spreaders 116 and 118 is coupled to a respective pulse shaping lowpass filter 120 and 122. Each filter has the impulse response h(t). The output signals from filters 120 and 122 are coupled to respective multipliers 124 and 126, multiplied with two orthogonal carrier sine waves, and algebraically added together by adder 128. The modulated signal, x(t), to be transmitted on the forward link can be expressed as:

$$x(t) = \Sigma_j (\alpha_{1,j} \cdot h(t-jT_c) \cdot \cos(\omega t) + \alpha_{2,j} \cdot h(t-jT_c) \cdot \sin(\omega t)) \quad (2)$$

Consequently, using differential encoding in the forward link with a narrow lobe transmission, the intended mobile station can utilize an existing differential coherent detector to detect two consecutive received data symbols and estimate the channel phase by determining the difference between the two symbols. In summary, by using differential encoding for the traffic channel, the receiver in the mobile station does not need a pilot channel as a reference for channel estimation. Channel estimation is accomplished using the differential coherent detection process. Therefore, the mobile station's receiver can decode the traffic channel without depending on the pilot channel.

FIG. 3 is a schematic circuit block diagram of a conventional signal processor unit 200 that can be used for the "old" forward link transmission mode unit 16 shown in FIG. 1. For a conventional DS-CDMA system, the forward link transmission mode (16) typically employs a QPSK modulation scheme. Notably, signal processor unit 200 is similar to signal processor unit 100 in FIG. 2, except signal processor unit 200 does not differentially encode the incoming data bits. Consequently, the output signals of multipliers (spreaders) 216 and 218 are not differentially encoded signals. Notably, since the incoming bitstream is not differentially encoded, signal processor unit 200 can also be used to modulate the physical data control channel data transmitted to a mobile station equipped for the new transmission mode.

In a third embodiment of the present invention, instead of using differentially encoded QPSK forward link transmissions for the physical control channel data, the new transmission mode unit 14 shown in FIG. 1 can be used to generate and transmit pilot symbols associated with the intended mobile station (22). For example, in an IS-95 type CDMA system, known pilot symbols can be inserted into the data bitstream by use of time-multiplexing. For example, every nth modulation data symbol is a pilot symbol instead of a data-modulated symbol. The mobile station's receiver will recognize each such recurring pilot symbol and use it to estimate the channel. Generally, M consecutive modulation symbols can be replaced with each interval of N modulation symbols. More specifically, from a practical standpoint, every second modulation symbol can be replaced by such a pilot symbol. Albeit, in an IS-95 type system, using every second modulation symbol for a pilot symbol would leave 4.8 kbps for user data. However, this technique would be advantageous for relatively high bit rate mobile users (e.g., where one mobile user occupies several code channels), because only one of those channels would have to carry the pilot symbols, which significantly decreases the signaling overhead requirements.

Although a preferred embodiment of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A cellular communications system comprising:
   a mobile station;
   a broadcast antenna system;
   a first forward link transmission mode unit, coupled to said broadcast antenna system, for broadcasting a pilot channel used as a reference for channel estimating by said mobile station to enable decoding of a dedicated traffic channel by said mobile station;
   a narrow lobe antenna system;
   a second forward link transmission mode unit, coupled to said narrow lobe antenna system, for broadcasting information used by the mobile station for decoding the dedicated traffic channel without depending on the pilot channel; and
   a transmission mode controller for selectively coupling data broadcasted within the dedicated traffic channel to one of said first forward link transmission mode unit and said second forward link transmission mode unit.

2. The cellular communications system according to claim 1, wherein said information further includes physical control channel data and said dedicated traffic channel further includes physical channel data.

3. The cellular communications system according to claim 2, wherein said second forward link transmission mode unit further includes a differential encoder coupled to a modulator, said differential encoder is operable to differentially encode the physical control channel data and the modulator is operable to modulate the differentially encoded physical control channel data.

4. The cellular communications system according to claim 3, wherein said mobile station further includes:
   a differential coherent detector for receiving the modulated differentially encoded physical control channel data;
   means for estimating a channel phase associated with the received modulated differentially encoded physical control channel data; and
   means for decoding the physical channel data using the estimated channel phase.

5. The cellular communications system according to claim 1, wherein said information further includes a plurality of pilot symbols.

6. The cellular communications system according to claim 4, wherein said second forward link transmission mode unit further includes a time-multiplexor for inserting at least one of the plurality of pilot symbols into the dedicated traffic channel.

7. The cellular communications system according to claim 6, wherein said mobile station further includes:
   means for receiving the dedicated traffic channel including the inserted at least one of the plurality of pilot symbols;
   means for detecting the inserted at least one of the plurality of pilot symbols;
   means for estimating a channel phase associated with the inserted at least one of the plurality of pilot symbols; and
   means for decoding the dedicated traffic channel using the estimated channel phase.

8. The cellular communications system according to claim 1, wherein said first forward link transmission mode unit further includes a modulator.

9. The cellular communications system according to claim 1, wherein said mobile station further includes means for generating a transmission mode format signal to selectively control said transmission mode controller.

10. The cellular communications system according to claim 9, wherein said transmission mode format signal indicates that said mobile station is equipped to receive transmissions from said narrow lobe antenna system.

11. The cellular communications system according to claim 9, wherein an absence of said transmission mode format signal indicates that said mobile station is equipped to receive transmissions from said broadcast antenna system.

12. The cellular communications system according to claim 1, wherein said narrow lobe antenna system further includes at least one transmitting element of a distributed antenna system.

13. The cellular communication system according to claim 1, wherein said narrow lobe antenna system further includes an adaptive antenna array.

14. A forward link transmission method for use in a cellular communications system, comprising the steps of:
   selectively coupling data broadcasted within a dedicated traffic channel to one of a first forward link transmission mode unit and a second forward link transmission mode unit;
   responsive to coupling the dedicated traffic channel to the first forward link transmission mode unit;
      broadcasting a pilot channel from a broadcast antenna system coupled to said first forward link transmission mode unit;
      receiving said pilot channel at a mobile station;
      estimating a channel phase using the received pilot channel; and
      decoding the dedicated traffic channel using the estimated channel phase; and
   responsive to coupling the dedicated traffic channel to the said second forward link transmission mode unit;
      broadcasting information from a narrow lobe antenna system coupled to said second forward link transmission mode unit;
      receiving said information at said mobile station; and
      decoding the dedicated traffic channel using the received information without depending on the pilot channel.

15. The method according to claim 14, wherein said information further includes physical control channel data and said dedicated traffic channel further includes physical channel data.

16. The method according to claim 15, wherein said step of broadcasting said information further includes differentially encoding the physical control channel data, and modulating the differentially encoded physical control channel data.

17. The method according to claim 16, wherein said step of receiving said information further includes the steps of:
receiving the modulated differentially encoded physical control channel data;
estimating a channel phase associated with the received modulated differentially encoded physical control channel data; and
decoding the physical channel data using the estimated channel phase.

18. The method according to claim 14, wherein said information further includes a plurality of pilot symbols, and said step of broadcasting said information further includes inserting at least one of the plurality of pilot symbols into the dedicated traffic channel.

19. The method according to claim 18, wherein said step of receiving said information further includes the steps of:
receiving the dedicated traffic channel including the inserted at least one of the plurality of pilot symbols;
detecting the inserted at least one of the plurality of pilot symbols;
estimating a channel phase associated with the inserted at least one of the plurality of pilot symbols; and
decoding the dedicated traffic channel using the estimated channel phase.

20. The method according to claim 14, wherein said step of selectively selecting further includes receiving a transmission mode format signal from said mobile station.

21. A forward link transmission system for connecting a mobile station to a cellular communications system, said forward link transmission system further comprising:
a broadcast antenna system;
a first forward link transmission mode unit, coupled to said broadcast antenna system, for broadcasting a pilot channel used as a reference for channel estimating by said mobile station to enable decoding of a dedicated traffic channel by said mobile station;
a narrow lobe antenna system;
a second forward link transmission mode unit, coupled to said narrow lobe antenna system, for broadcasting information used by the mobile station for decoding the dedicated traffic channel without depending on the pilot channel; and
a transmission mode controller for selectively coupling data broadcasted within the dedicated traffic channel to one of said first forward link transmission mode unit and said second forward link transmission mode unit.

22. The forward link transmission system according to claim 21, wherein said information further includes physical control channel data and said dedicated traffic channel further includes a physical channel data.

23. The forward link transmission system according to claim 22, wherein said second forward link transmission mode unit further includes a differential encoder coupled to a modulator, said differential encoder is operable to differentially encode the physical control channel data and the modulator is operable to modulate the differentially encoded physical control channel data.

24. The forward link transmission system according to claim 21, wherein said information further includes a plurality of pilot symbols.

25. The forward link transmission system according to claim 24, wherein said second forward link transmission mode unit further includes a time-multiplexor for inserting at least one of the plurality of pilot symbols into the dedicated traffic channel.

26. The forward link transmission system according to claim 21, wherein said first forward link transmission mode unit further includes a modulator.

27. The forward link transmission system according to claim 21, wherein said narrow lobe antenna system further includes at least one transmitting element of a distributed antenna system.

28. The forward link transmission system according to claim 21, wherein said narrow lobe antenna system further includes an adaptive antenna array.

29. A forward link transmission method for use in a cellular communications system, comprising:
selectively coupling data associated with a traffic channel to one of a first forward link transmission mode unit and a second forward link transmission mode unit;
responsive to coupling the traffic channel data to the first forward link transmission mode unit, transmitting from a broadcast antenna system coupled to said first forward link transmission unit a pilot channel to be used for channel estimating by a mobile station to enable the mobile station to decode the traffic channel; and
responsive to coupling the traffic channel to the second forward link transmission mode unit, transmitting from a narrow lobe antenna system coupled to said second forward link transmission unit information with which a mobile station can decode the traffic channel without depending on the pilot channel.

30. A forward link transmission system for connecting mobile stations to a cellular communications network, comprising:
a broadcast antenna system;
a narrow lobe antenna system;
a first forward link transmission mode unit having an input and an output;
a second forward link transmission mode unit having an input and an output;
a transmission mode controller for selectively coupling data associated with a traffic channel to one of said input of said first forward link transmission mode unit and said input of said second forward link transmission mode unit;
said output of said first forward link transmission mode unit coupled to said broadcast antenna system for transmitting a pilot channel to be used for channel estimating by a mobile station to enable the mobile station to decode the traffic channel; and
said output of said second forward link transmission mode unit coupled to said narrow lobe antenna system for transmitting information with which a mobile station can decode the traffic channel without depending on the pilot channel.

* * * * *

UNITED STATES PATENT AND TRADEMARK OFFICE
CERTIFICATE OF CORRECTION

PATENT NO. : 5,953,325
DATED : Sep. 14, 1999
INVENTOR(S) : Willars

It is certified that error appears in the above-identified patent and that said Letters Patent is hereby corrected as shown below:

Column 6, line 13      Replace "$\delta_i = d_i \cdot \delta_{i-1} \, \delta_i \in \{\pm 1\}$"

With --$\delta_i = d_i \cdot \delta_{i-1}$      $\delta_i \in \{\pm 1\}$--

Signed and Sealed this

Second Day of May, 2000

Q. TODD DICKINSON

*Attest:*

*Attesting Officer*      *Director of Patents and Trademarks*